(12) United States Patent
Koike

(10) Patent No.: US 6,850,926 B2
(45) Date of Patent: Feb. 1, 2005

(54) DATA PROCESSING APPARATUS, DATA PROCESSING METHOD, AND RECORDING MEDIUM

(75) Inventor: Motoyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 09/934,185

(22) Filed: Aug. 21, 2001

(65) Prior Publication Data

US 2002/0049755 A1 Apr. 25, 2002

(30) Foreign Application Priority Data

Aug. 23, 2000 (JP) .................................... 2000-251970

(51) Int. Cl.$^7$ ......................... G06F 17/00; G06F 17/30
(52) U.S. Cl. .................. 707/2; 707/3; 707/5; 705/45
(58) Field of Search ............................ 707/1–3, 6–7, 707/100, 102; 706/39, 45–48, 61

(56) References Cited

U.S. PATENT DOCUMENTS 5,974,405 A * 10/1999 McGuinness et al. ......... 706/45
6,324,533 B1 * 11/2001 Agrawal et al. ............... 707/3
2002/0147695 A1 * 10/2002 Khedkar et al. .............. 706/15

* cited by examiner

Primary Examiner—Alford Kindred
(74) Attorney, Agent, or Firm—Frommer Lawrence & Haug LLP; William S. Frommer

(57) ABSTRACT

A data processing system providing a result of filtering an item desired by an individual user. On receipt of a request from a user terminal for executing a process of filtering a predetermined item, a filtering evaluation system instructs a plurality of filtering systems to individually execute a filtering process. On receipt of the result of the filtering process, the user terminal individually sets specific compatibility ratings for designating ratings of compatibility with a desired degree and then transfer the rated rankings to the filtering evaluation system. Based on the received compatibility ratings, the filtering evaluation system establishes a preferential filtering system out from the various filtering systems. Thenceforth, the user terminal is enabled to receive the result of the filtering process acquired by the preferential filtering system.

15 Claims, 14 Drawing Sheets

FIG.8

| TERM | FILTERING SYSTEM 3-1 | FILTERING SYSTEM 3-2 | FILTERING SYSTEM 3-3 |
|---|---|---|---|
| FORWARD COINCIDENCE | % | ? | : |
| AND (LOGIC PRODUCT) | AND | × | + |
| OR (LOGIC SUM) | OR | + | ¥ |

FIG.9

(A) FILTERING CONDITION FORMULATION = GRAPE%AND FARM (B) CONDITION FORMULATION AFTER CONVERSION FROM FILTERING SYSTEM 3-2
= GRAPE ? × FARM (C) CONDITION FORMULATION AFTER CONVERSION FROM FILTERING SYSTEM 3-3
= GRAPE; + FARM

FIG.10

| FILTERING CATEGORY | AVERAGE EVALUATION VALUE OF FILTERING SYSTEM 3-1 DURING THE TERM | AVERAGE EVALUATION VALUE OF FILTERING SYSTEM 3-2 DURING THE TERM | PREFERENTIAL FILTERING SYSTEM |
|---|---|---|---|
| COMPUTER RELATED DATA | 1.3 | 1.1 | FILTERING SYSTEM 3-1 |
| TECHNICAL DATA | 0.3 | 1.2 | FILTERING SYSTEM 3-2 |
| BUSINESS INFORMATION | 1.4 | 1.3 | FILTERING SYSTEM 3-1 |
| MUSIC CONTENTS | 0.6 | 0.8 | FILTERING SYSTEM 3-2 |
|  |  |  |  |

FIG.13

| ITEM ID | COMPATIBILITY RATING $A_n$ | LISTING RANKING $X_1$ IN FILTERING SYSTEM 3-1 | LISTING RANKING $X_2$ IN FILTERING SYSTEM 3-2 |
|---|---|---|---|
| ITEM 1 | 3 | 4 | 6 |
| ITEM 2 | 2 | 7 | 8 |
| ITEM 3 | 1 | 8 | 40 |
| ITEM 4 | 0 | 19 | 51 |
| EVALUATION VALUE $V_n$ | | 1.160714 | 0.75 |

FIG. 14

| ITEM ID | COMPATIBILITY RATING $A_n$ | SCORE $Y_1$ IN FILTERING SYSTEM 3-1 | SCORE $Y_2$ IN FILTERING SYSTEM 3-2 |
|---|---|---|---|
| ITEM 1 | 3 | 0.8 | 0.6 |
| ITEM 2 | 2 | 0.6 | 0.5 |
| ITEM 3 | 1 | 0.4 | 0.2 |
| ITEM 4 | 0 | | |
| EVALUATION VALUE $V_n$ | | 4.0 | 3.0 |

DATA PROCESSING APPARATUS, DATA PROCESSING METHOD, AND RECORDING MEDIUM

BACKGROUND OF THE INVENTION

1. Field of the Invention

The present invention relates to a data processing apparatus, a data processing method, and a recording medium. More particularly, the present invention relates to such a data processing apparatus, such a data processing method, and a recording medium, which respectively enable individual users to effectively acquire results of filtering of desired items.

2. Related Art

Recently, along with the diffusion of Internet services, individual users are enabled to execute a filtering process related to a desired input key word by way of accessing a variety of filtering systems (i.e., reference system) connected to any of those Internet service lines by using their own terminal equipment. A related art is disclosed in Unexamined Japanese Patent Application Laid-Open Specifications No.2000-76252 and No.2000-123036.

Taking such a data filtering module for example, when a user outputs a filtering instruction after inputting a key word related to such a data desired by the user himself, result of the filtering process is listed up in order of higher hit rate, for example. The user seeks for the objective item while confirming titles of the listed-up items or summary thereof.

In the case in which such a system proposing certain contents data or such items compatible with taste/preferences or visual and auditory antecedents, based on attribute data such as preference data, age, address, family make-up, and annual income of a previously registered user, the system recommends or proposes a variety of video programs, music tunes, books, or clothes compatible with taste and attribute of the registered user.

When utilizing the above system, an individual user thinks out a specific key word related to the data that should be filtered by himself, and then transmits the devised key word to a predetermined filtering system, which then lists up the result of the filtering process in order of higher hit rate before transferring the listed-up results to the user terminal.

On receipt of the transferred filtering results, user confirms the titles and summary of the filtering results, and then, accesses a specific file designating the title and summary thereof as required. Finally, user checks to see whether the desired filtering results have been acquired or not.

In the event of the user failing to acquire the desired filtering results, he exerts himself to acquire the desired filtering results by way of changing the key word or shifting the present filtering system to another filtering system.

It has be understood that all the filtering systems are not provided with exactly identical data bases. For example, a certain filtering system features the filtering related to music items, whereas another filtering system features the filtering related to scientific items, whereby individual filtering systems exhibit specific features different from each other.

Accordingly, individual users empirically grasp such knowledge to discern featuring fields of individual filtering systems to enable them to utilize a specific filtering system depending on the actual needs.

As a consequence, such an experienced user frequently exercising the filtering process on business has already grasped concrete features of the individual filtering system, whereby enabling himself to properly and effectively utilize individual filtering systems depending on the filtering objects. On the other hand, users in general who are devoid of such knowledge to discern features of individual filtering systems entail much difficulty to effectively acquire the desired filtering results, thus constituting a problem.

SUMMARY OF THE INVENTION

The present invention has been conceived in order to enabling users in general to effectively acquiring desired filtering results as required.

The data processing apparatus realized by the present invention includes the following; a first acquiring means which acquires a request related to a process for filtering a desired specific item; an instructing means which instructs a plurality of filtering systems to execute a process for filtering a desired specific item based on the request acquired by the first acquiring means; a second acquiring means which acquires results of filtering the specific item from a plurality of filtering systems; a third acquiring means which acquires antecedents related to utilization of the item on the part of an individual user; and an evaluation value computing means which computes evaluation values related to the filtering of the specific item of a plurality of filtering systems based on the antecedents of utilization of the specific item by an individual user acquired via the third acquiring means and the result of the filtering of the specific item acquired via the second acquiring means.

The above-referred item utilization antecedents may include compatibility set by an individual user.

The data processing apparatus realized by the present invention may further include a fourth acquiring means which acquires such a filtering additional data at least related to one of those data having the filtering antecedents, taste data, or attribute data related to an individual user. The above-referred instructing means may further instruct a plurality of filtering systems to execute a filtering process by way of adding the filtering additional data acquired via the fourth acquiring means to the specific item.

It is also possible for the above-referred evaluation value computing means to compute evaluation value via weighting based on the date and time of utilizing a specific item.

The data processing apparatus realized by the present invention may further include a setting means for setting a preferential filtering system based on the evaluation value.

It is also possible for the setting means to set a preferential filtering system based on the average value of the evaluation values during a predetermined period of time.

The data processing apparatus realized by the present invention may further have an output means which outputs the filtering result generated by the above-referred preferential filtering system to terminal equipment of an individual user.

The data processing apparatus realized by the present invention may still further include an average-value computing means for computing average value of the evaluation values during a predetermined period of time per filtering system.

The data processing apparatus realized by the present invention may further include a sorting means for sorting filtering systems based on the average value of the evaluation values.

It is also possible for the above-referred average value computing means to compute an average value of the evaluation values per category of designated items.

The data processing apparatus realized by the present invention may further comprise a notifying means for notifying filtering systems of the evaluation values and average value thereof.

The data processing apparatus realized by the present invention may further comprise the following: a transmitting means which transmits a user interface code required for inputting filtering condition based on such items; and a converting means which converts the input filtering condition based on the user interface code transmitted via the transmitting means into a specific condition compatible with the filtering systems; the above instructing means may also instruct the filtering system to execute a filtering process based on the condition compatible with the filtering systems converted by the converting means.

The data processing method realized by the present invention comprises those serial steps including the following: a first acquiring step of acquiring a request related to a process for filtering a desired specific item; an instructing step of instructing a plurality of filtering systems to execute a process for filtering the designated item; a second acquiring step of acquiring results of filtering the designated item from a plurality of filtering systems; a third acquiring step of acquiring antecedents related to utilization of the designated item by an individual user; and an evaluation value computing step of computing evaluation values related to the filtering of the items of a plurality of filtering systems based on the item utilization antecedents acquired via the third acquiring step and the result of filtering such item acquired via the processes executed by the second acquiring step.

A program related to the recording medium according to a preferred embodiment of the present invention has those serial processing steps including the following: a first acquiring step of acquiring a request related to a process for filtering a desired specific item; an instructing step of instructing a plurality of filtering systems to execute a process for filtering the designated item based on the request acquired via the process executed by the first acquiring step; a second acquiring step of acquiring result of the item-filtering process from a plurality of filtering systems; a third acquiring step of acquiring antecedents related to utilization of the designated item by an individual user; and an evaluation value computing step of computing evaluation values related to the filtering of the items of a plurality of filtering systems based on the item utilization antecedents acquired via the third acquiring step and the result of filtering said item acquired via the processes executed via the second acquiring step.

The data processing system according to a preferred embodiment of the present invention includes the following: a terminal equipment installed on the part of an individual user comprising; a transmitting means for transmitting a request for the filtering of a designated item to the inventive data processing system; and a receiving means for receiving the result of the filtering of the designated item from the inventive data processing system; a data processing apparatus having a first acquiring means for acquiring a request for executing a process for filtering a designated item; an instructing means for instructing a plurality of filtering systems to execute a process for filtering the designated item based on the request acquired via the first acquiring means; a second acquiring means for acquiring result of the filtering of the designated item from a plurality of filtering systems; a third acquiring means for acquiring antecedents related to the utilization of the designated item by an individual user; and an evaluation value computing means for computing evaluation values related to the filtering of items of a plurality of filtering systems based on the antecedents of item utilization acquired via the third acquiring means and the result of the item filtering process acquired via the second acquiring means; and a plurality of filtering systems individually having an execution means for executing a process for filtering a designated item based on the request from the data processing apparatus and a transferring means for transferring the result of the item filtering process acquired via the process executed by the executing means.

In the data processing apparatus, the data processing system, and the program of the recording medium according to the present invention, based on the antecedents of utilization of designated items by an individual user, evaluation values of the filtering system are computed.

BRIEF DESCRIPTION OF THE DRAWINGS

The foregoing and other objects, features and advantages of the present invention will be apparent to those skilled in the art from the following description of the presently preferred exemplary embodiments of the invention taken in connection with the accompanying drawings, in which:

FIG. 8 presents a chart describing formulation of the filtering condition, according to a preferred embodiment of the present invention;

FIG. 9 presents equations describing conversion of the formulation of the filtering condition, according to a preferred embodiment of the present invention;

FIG. 10 presents a chart describing the preferential filtering system, according to a preferred embodiment of the present invention;

FIG. 13 presents a chart describing evaluation values according to a preferred embodiment of the present invention; and FIG. 14 presents another chart describing evaluation values according to a preferred embodiment of the present invention.

DESCRIPTION OF THE PREFERRED EMBODIMENTS

Figure 1:
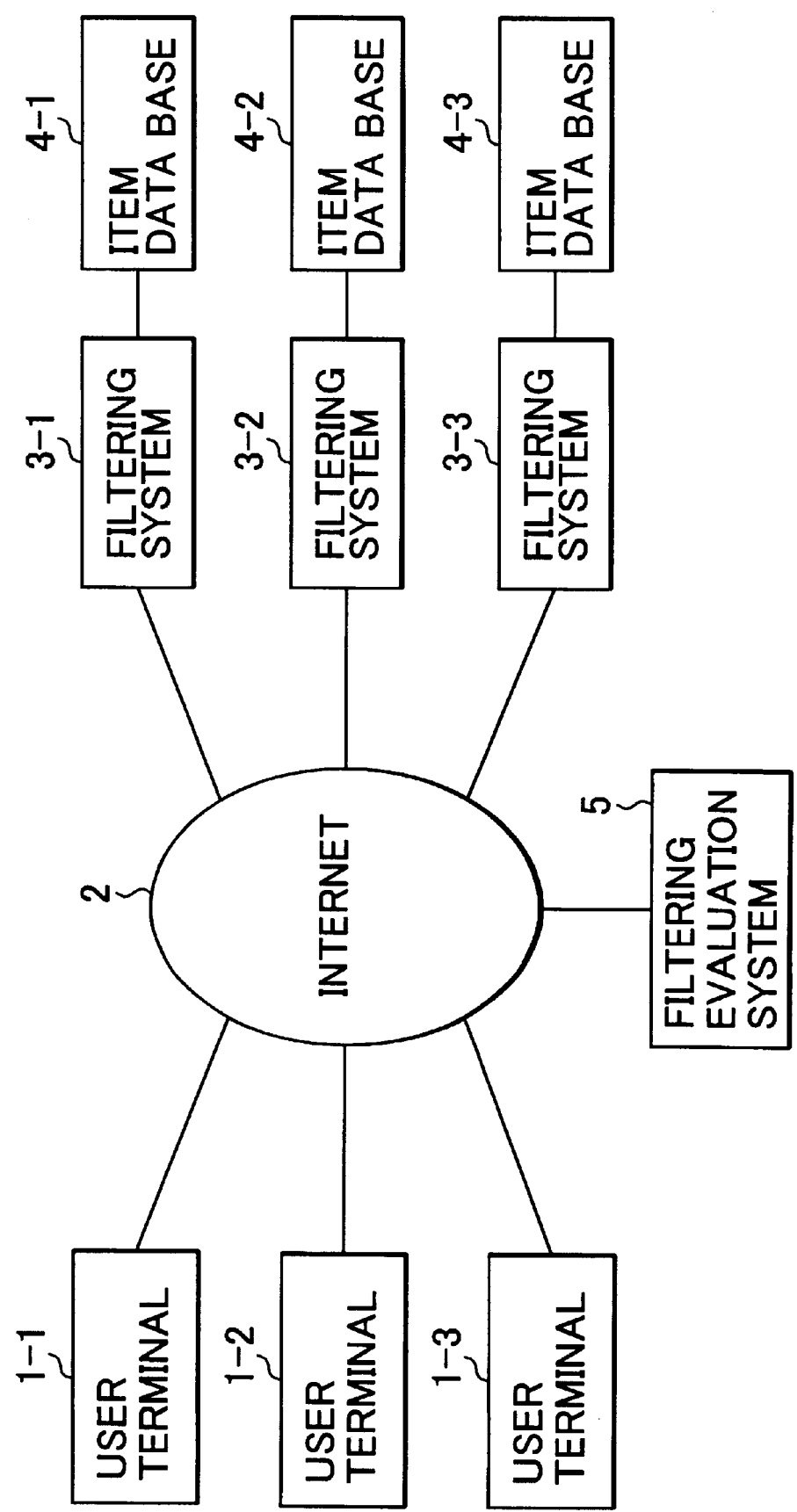
FIG. 1 presents a simplified schematic block diagram of a data processing system according to a preferred embodiment of the present invention.

FIG. 1 exemplifies a simplified construction of a data processing system according to a preferred embodiment of the present invention. In this system, a plurality of terminals 1-1, 1-2 and 1-3 are individually connected to an Internet service line 2. It has to be noted that, unless individual distinction is required, this terminal equipment are merely referred to as a user terminal. The same applies to other facilities. Further, the Internet service line 2 is also linked to a plurality of filtering systems 3-1, 3-2 and 3-3, which, in response to the request from the user terminals 1-1, 1-2 and 1-3, individually filters (detects) such data related to "items" on receipt of an instruction so as to referring to filtering objects including a variety of contents data and information related to tangible and intangible objects such as music data, news items of newspapers, books, cars, individuals, pets, or the like. In addition, the term "item" includes the above-referred tangible and intangible objects en bloc.

The above filtering systems 3-1, 3-2 and 3-3 are individually connected to "item" data bases 4-1, 4-2 and 4-3, which individually store addresses (such as URL and IP addresses for example) on a network service line preserving "items" in correspondence with attributes (including related key words, summary, and classification) of "items". On receipt of an instruction for executing a filtering process including conditional formulation, in correspondence with specific conditional formulation and need, and yet, based on user data stored in a user data base 91 (shown in FIG. 2), the above filtering systems 3-1 to 3-3 individually execute a process for filtering "items" out from the above "item" data bases and then output the results of the filtering process by listing up "items" in order of higher score after raising scores of such "items" having higher compatibility with the filtering instruction. More specifically, when the conditional formulation consists of reference words, the filtering systems individually raise scores of such "items" containing a greater number of reference words in a corresponding attribute, and then serially output the corresponding "items" in order of higher scores via listing. The filtering system comprising the above "item" data bases 4-1, 4-2 and 4-3 and the above filtering systems 3-1, 3-2 and 3-3 are constructed with such an integral system called a "robot detection engine" for example.

The above Internet service line 2 is further linked with a filtering evaluation system 5 for evaluating the result of the filtering process executed by the above filtering systems 3-1 to 3-3.

In FIG. 1, the filtering evaluation system 5 comprises such a construction different from that of the user terminal 1. However, it is also possible to integrate the construction of the above filtering evaluation system 5 with the user terminal 1.

Figure 2:
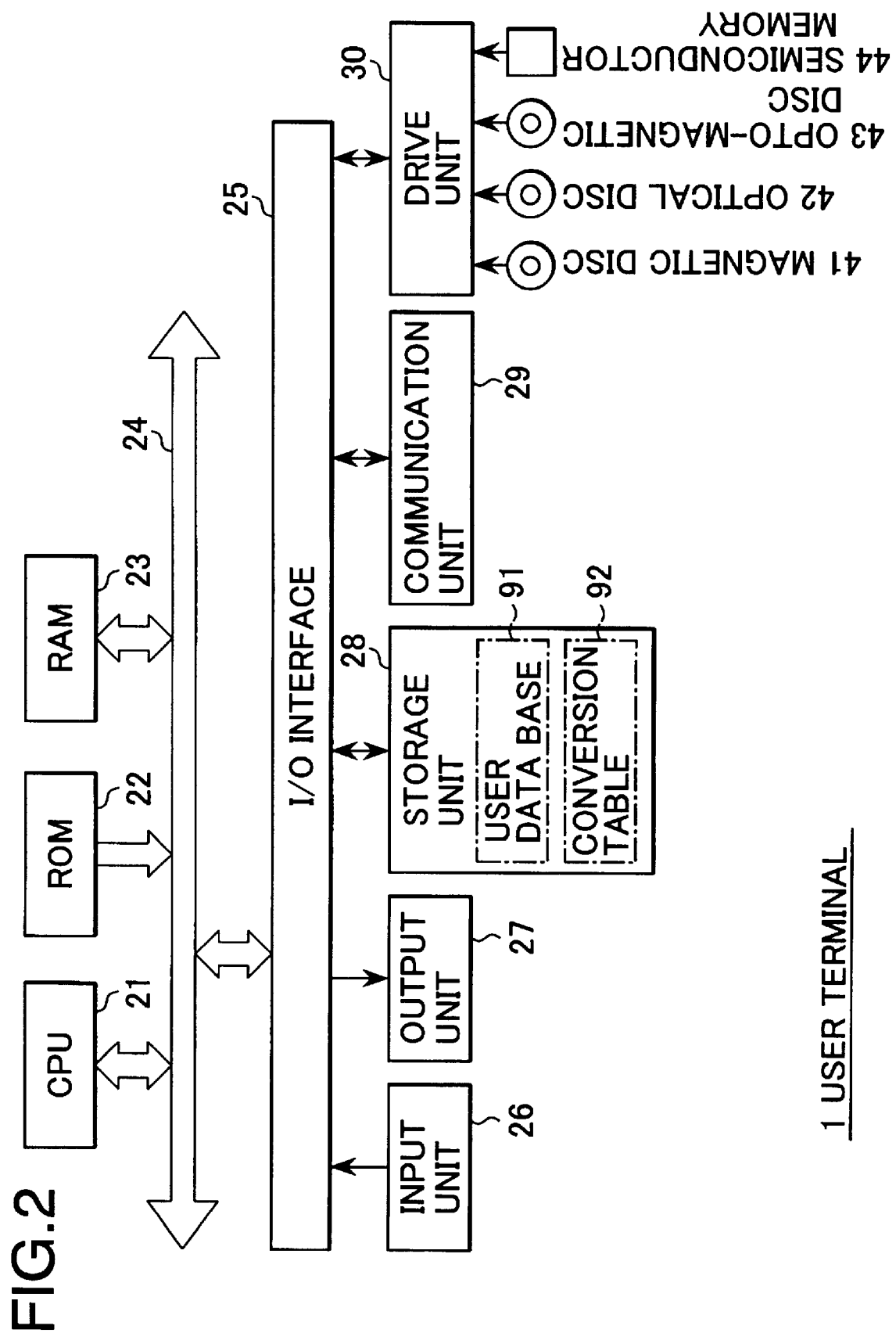
FIG. 2 presents a simplified schematic block diagram of a terminal equipment installed on the part of an individual user according to a preferred embodiment of the present invention.

FIG. 2 presents an example of the construction of the user terminal 1. In compliance with a variety of programs stored in a ROM (Read Only Memory) 22 or a variety of programs down-loaded from a storage unit 28 to a RAM (Random Access Memory) 23, the CPU 21 executes a variety of processing operations. The RAM 23 further stores those data required for the CPU 21 whenever the CPU 21 executes a variety of processing operations.

The CPU 21, ROM 22, and the RAM 23 are mutually connected to each other via a bus line 24, which is also linked with an I/O (input and output) interface unit 25.

The I/O interface unit 25 is further linked with an input unit 26 consisting of a keyboard and a mouse, a display unit consisting of a CRT or an LCD, an output unit 27 consisting of speaker units, a storage unit 28 consisting of a hard disc or the like, and a communication unit 29 consisting of a modem and a terminal adaptor for example. The communication unit 29 executes communication processes via the Internet service line 2.

The I/O interface unit 25 is further linked to a drive unit 30 as required. The drive unit 30 is loaded with a magnetic disc 41, an optical disc 42, an opto-magnetic disc 43, or a semiconductor memory 44 whenever necessary A specific computer program read out from any of them is installed in the storage unit 28 as required.

As shown in FIG. 2, when the filtering evaluation system 5 is integrally constructed with the user terminal 1, a user data base 91 and a conversion table 92 are jointly stored in a storage unit 28 of the user terminal 1.

Figure 3:
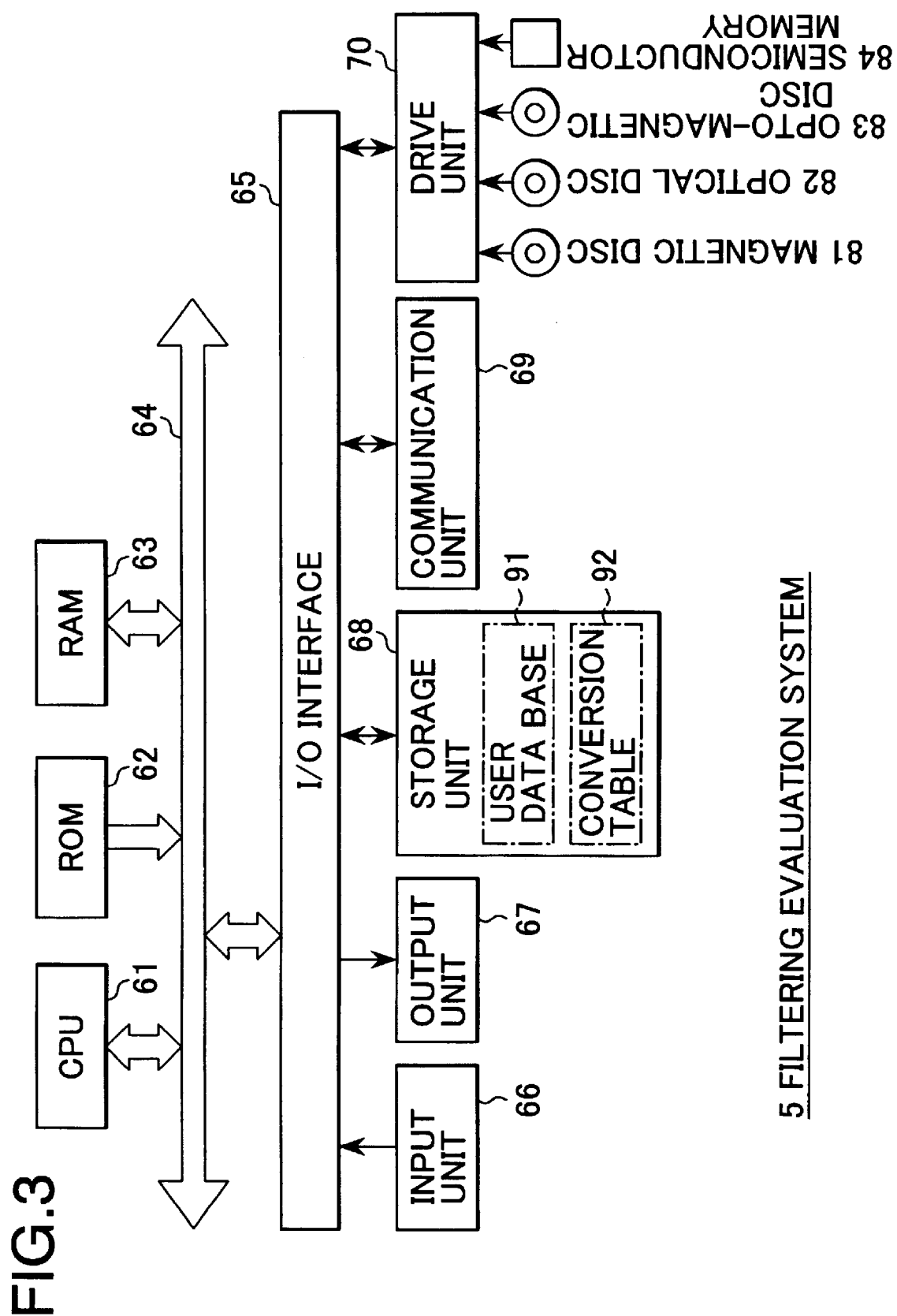
FIG. 3 presents a simplified schematic block diagram of the filtering evaluation system shown in FIG. 1 according to a preferred embodiment of the present invention.

FIG. 3 presents another example of the construction of the filtering evaluation system 5. The filtering evaluation system shown in FIG. 3 incorporates a CPU 61 and a drive unit 70. Inasmuch as the basic construction of this filtering evaluation system 5 is identical to that of the user terminal 1 incorporating the CPU 21 and the drive unit 30 shown in FIG. 2, description thereof is deleted. However, a storage unit 68 of the filtering evaluation system 5 shown in FIG. 3 is provided with a user data base 91 and a conversion table 92. The drive unit 70 drives either a magnetic disc 81, an optical disc 82, an opto-magnetic disc 83, or a semiconductor memory 84.

Basically, another filtering system 3 is constructed with such a structure identical to that of the user terminal 1, and thus, illustration thereof is omitted.

Figure 4:
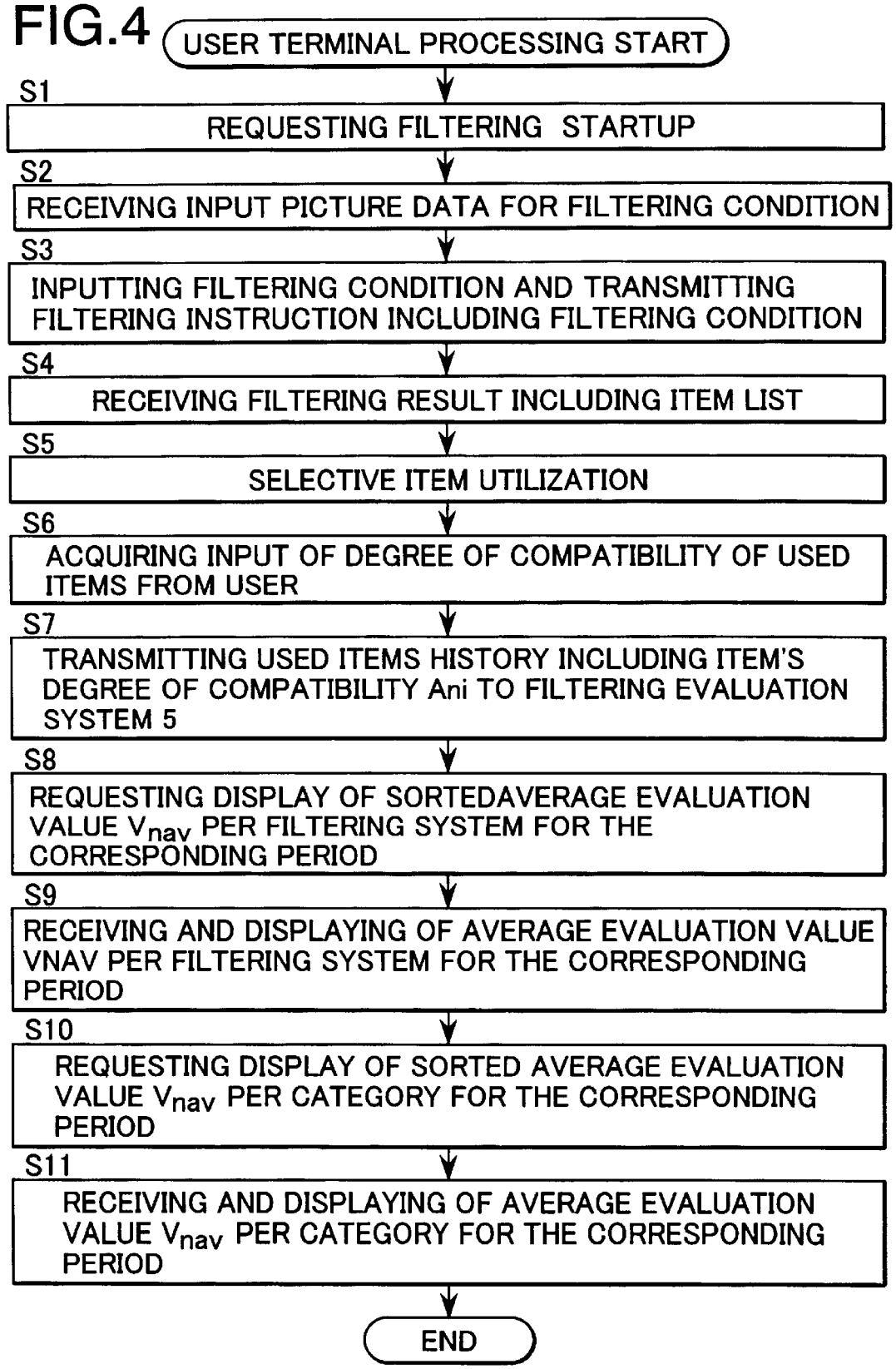
FIG. 4 presents a flowchart describing serial operations of a terminal equipment installed on the part of an individual user according to a preferred embodiment of the present invention.
Figure 5:
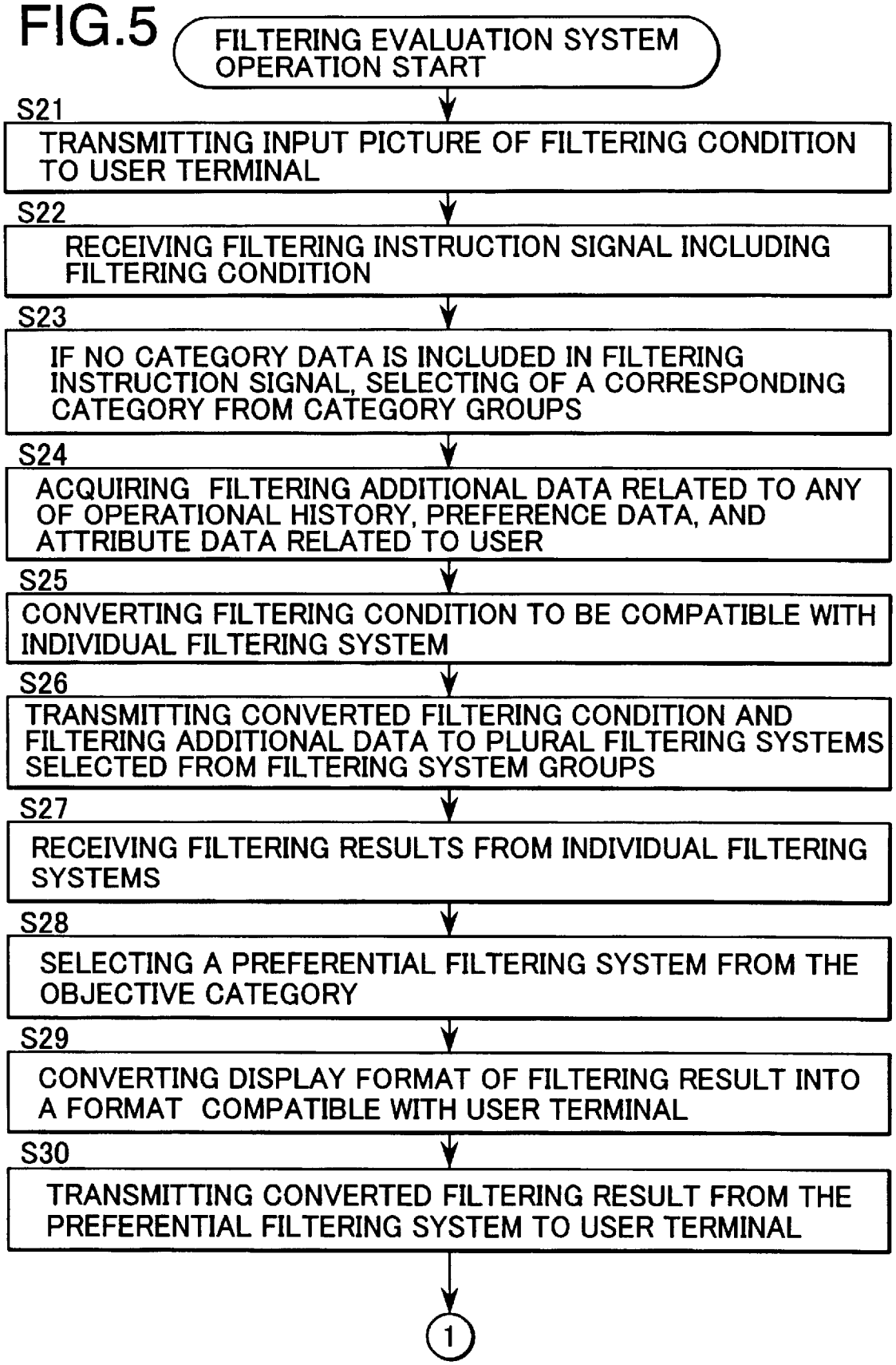
FIG. 5 presents a flowchart describing serial operations of the filtering evaluation system shown in FIG. 1, according to a preferred embodiment of the present invention.
Figure 6:
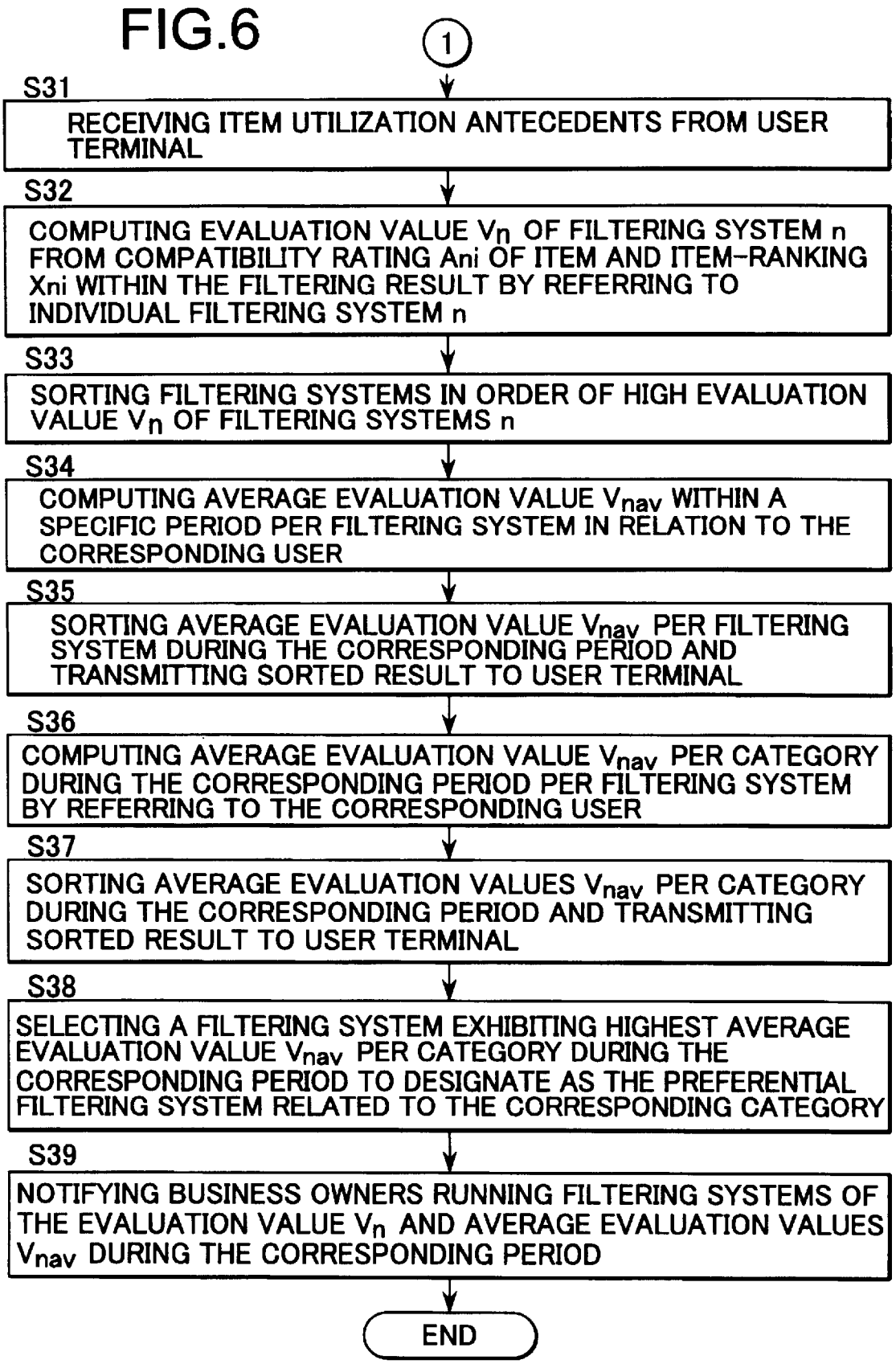
FIG. 6 presents a flowchart describing serial operations of the filtering evaluation system shown in FIG. 1, according to a preferred embodiment of the present invention.
Figure 7:
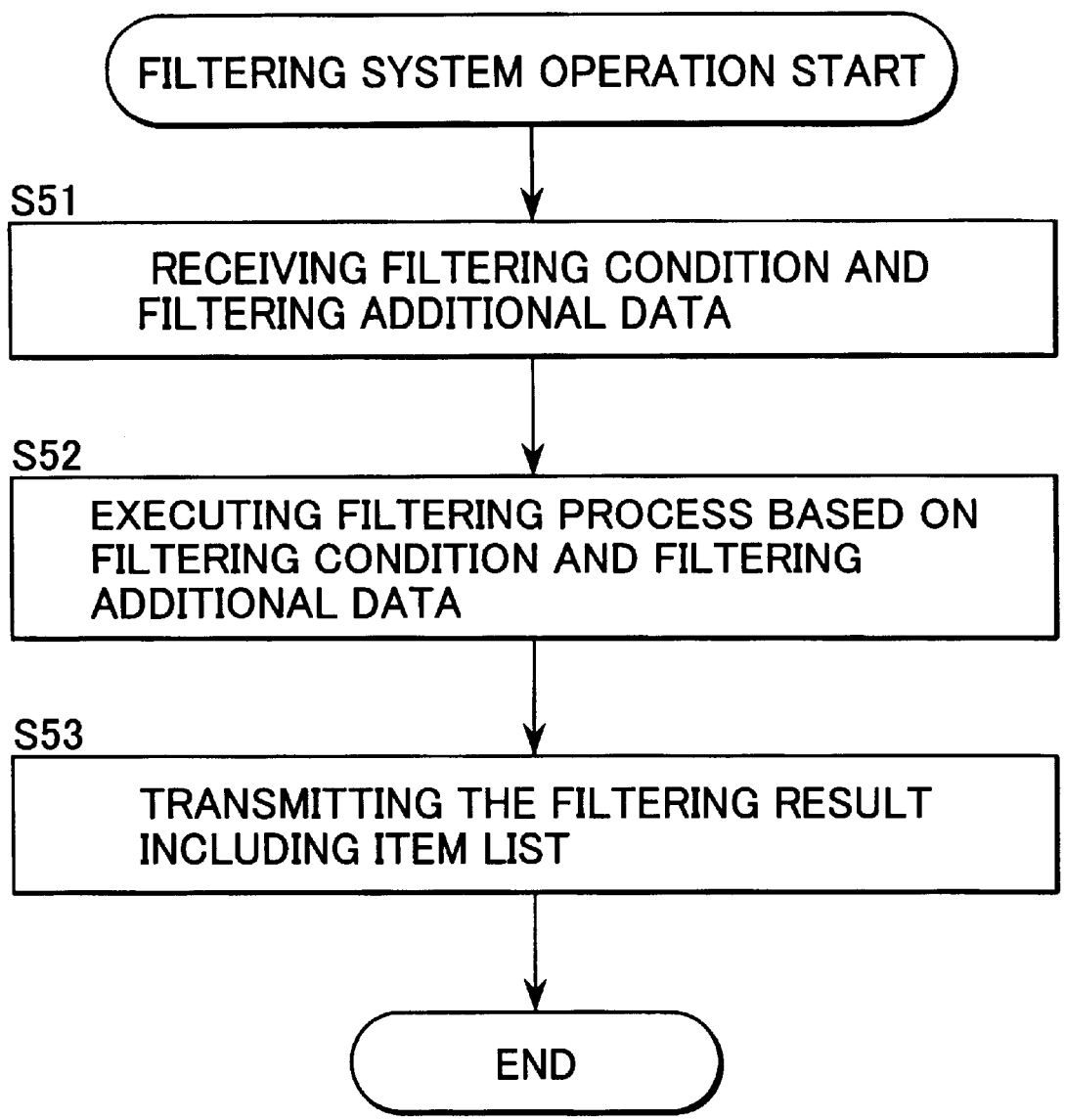
FIG. 7 presents a flowchart describing serial operations of the filtering system shown in FIG. 1, according to a preferred embodiment of the present invention.

Referring now to the flowcharts shown in FIG. 4 to FIG. 7, serial processing steps executed by this network system are described below. FIG. 4 expresses serial processes executed by the user terminal 1. FIG. 5 and FIG. 6 individually express serial processing steps executed by the filtering evaluation system 5. FIG. 7 expresses serial processing steps executed by the filtering system 3.

Initially, step S1 is entered, in which, when a user operates the input unit 26 to instruct the CPU 21 of the user terminal to commence a filtering process. In response, based on this instruction, the CPU 21 controls the communication unit 29 and then requests the filtering evaluation system 5 to start up the filtering process. This request is transferred to the filtering evaluation system 5 via the Internet service line 2.

The CPU 61 of the filtering evaluation system 5 simultaneously receives this request from the user terminal via a communication unit 69, whereby step S21 is entered. While step S21 goes on, filtering condition input screen (GUI) is read out from a storage unit 68, which is then transmitted to the user terminal 1 via the communication unit 69. Data of the filtering condition input screen GUI is transferred to the user terminal via the Internet service line 2.

When step S2 is entered, the CPU 21 of the user terminal 1 receives data of the filtering condition input screen transferred from the filtering evaluation system 5 and then outputs the received data to an output unit 27 for display. Then, based on the filtering condition input screen being displayed, user of the user terminal 1 inputs the filtering condition by operating the input unit 26.

During the process in step S21, the filtering condition input screen is transmitted to the user terminal 1 based on the request from the user terminal 1. On the other hand, in such a case in which execution of the filtering process on a periodical basis or at a predetermined time is previously registered in the storage unit 68 of the filtering evaluation system 5, then, based on the registered request, data of the filtering condition input screen is transmitted to the user terminal 1 based on the predetermined period or at a predetermined time and date.

Next, based on the filtering condition input screen data transferred from the filtering evaluation system 5, the CPU 21 of the user terminal 1 inputs filtering condition for filtering the corresponding items. Next, step S3 is entered, in which the CPU 21 transmits a filtering instruction including the filtering condition to the filtering evaluation system 5.

When step S22 is entered, the CPU 61 of the filtering evaluation system 5 receives the filtering instructing signal including the filtering condition transferred from the user terminal 1. Next, step S23 is entered, in which category data contained in the filtering instructing signal is extracted. The filtering category implies such categories to which such items subject to a filtering process belong. For example, such categories cited above may comprise computer-related data, technical information, business information, music contents data, or the like. When a user of the user terminal 1 inputs a certain filtering category to which the above items belong into the filtering condition input screen, the designated categories are extracted. On the other hand, in the case in which the designated category is not included in the filtering instructing signal, the CPU 61 selects a proper category corresponding to a specific item set forth in the filtering instruction out from previously prepared category groups.

Next, step S24 is entered, in which the CPU 61 reads a variety of filtering additional data from a user's data basis 91, where the data includes antecedents of various filtering operations demanded from individual users, data of user's taste, or filtering additional data related to attribute data.

Various operational antecedents mentioned above imply those antecedents of users in terms of purchasing goods, antecedents of users requesting reference to filtering process, filtering antecedents, contents data utilization antecedents, item utilization antecedents, or the like. Data on user's taste implies favorite colors, favorite artists, favorite foods, interested objects, or the like. Attribute data implies user's age, sex, residential area, occupation, annual income, or the like.

Among the above-referred various antecedents of utilization of specific items by an individual user, data related to user's taste, and attribute data related to user, those predetermined data were previously transferred from the user terminal 1 to the filtering evaluation system 5 by the user himself, which were then registered into the user data base 91 as the filtering additional data. The rest of the predetermined data were also treated with the filtering process, and then, the processed contents were also registered into the user's data base 91 as the filtering additional data proper to the user whenever the CPU 61 of the filtering evaluation system 5 carried out predetermined processes based on the user's request.

Next, step S25 is entered, in which the CPU 61 of the filtering evaluation system 5 executes a process to cause the filtering condition received from the user via step S22 to be converted into the one that can properly conform to the filtering systems 3-1, 3-2 and 3-3.

For example, as shown in FIG. 8, in the filtering system 3-1, among a variety of conditions for prescribing the filtering conditional formulation, it is so requested that "forward coincidence" shall be expressed by a symbol "%", AND shall be expressed by "AND", and OR shall be expressed by "OR", respectively.

On the other hand, in the filtering system 3-2, it is so requested that "forward coincidence" shall be expressed by a symbol "?", AND shall be expressed by symbol "×", and OR shall be expressed by symbol "+", respectively.

On the other hand, in the filtering system 3-3, it is so requested that "forward coincidence" shall be expressed by symbol ":", AND shall be expressed by symbol "+", and OR shall be expressed by symbol "¥". respectively.

As shown in FIG. 9A, when a user inputs such a conditional formulation "Grape % AND Farm" in accordance with the filtering conditional formulation prescribed in the filtering system 3-1, as a specific filtering conditional formulation when requesting the filtering system 3-2 to execute a filtering process, as shown in FIG. 9B, the CPU 61 of the filtering evaluation system 5 converts the conditional formulation shown in FIG. 9A into such a conditional formulation expressed by "Grape ?×Farm". As shown in FIG. 9C, a conditional formulation "Grape:+Farm" is generated for transfer to the filtering system 3-3.

Accordingly, even when an individual user is not aware of the rule of the conditional formulations prescribed for the filtering systems 3-2 and 3-3, it is still possible for the user to request the filtering systems 3-2 and 3-3 to properly execute a filtering process based on the rule of the conditional formulation prescribed for the filtering system 3-1.

The above conditional formulations required for the above-cited conversion are stored in a conversion table 92 of the storage unit 68. Based on the contents of the conditional formulations stored in the conversion table 82, the CPU 61 of the filtering evaluation system 5 executes the above-referred conversion process.

Next, step S26 is entered, in which the CPU 61 of the filtering evaluation system 5 selects an optional number of filtering conditions converted in the preceding step S25 and filtering additional data acquired during step S24 out from a plurality of filtering systems previously stored in the storage unit 68, and then transmits the selected data to them.

In this way, filtering conditions and filtering additional data output from the filtering evaluation system 5 are transferred to a plurality of selected filtering systems 3 via the Internet service line 2. On receipt of the transferred data, the filtering system 3 executes those serial processes set forth in the flowchart shown in FIG. 7.

More specifically, while step S51 is underway, the filtering system 3 receives such filtering conditions and filtering additional data transferred from the filtering evaluation system 5. When the following step S52 is entered, based on the filtering conditions and filtering additional data received during the preceding step S51, the filtering system 3 executes a filtering process. Inasmuch as the filtering conditions have already been converted into the one compatible with the corresponding filtering systems 3, individual filtering systems 3 are enabled to execute a filtering process based on the condition exactly matching themselves.

Availing of its respective data base, each of the filtering systems 3 accesses a variety of servers via the Internet service line 2 as required, and then executes a filtering process in correspondence with the preset filtering conditions and the filtering additional data.

Next, step S53 is entered, in which each of the filtering systems 3 acquires the result of the filtering process including a list of items, and then transmits the acquired result to the filtering evaluation system 5 via the Internet service line 2.

While step S27 is underway, the CPU 61 of the filtering evaluation system 5 receives the result of the filtering process from each of the filtering systems 3. Results of the filtering processes received from individual filtering systems 3 are serially rated in order of the higher hit rate in accordance with the ranking of hit rates of objective items dealt by individual filtering systems 3.

Next, step S28 is entered, in which the CPU 61 of the filtering evaluation system 5 selects a preferential filtering system preset in an objective category (the category extracted or selected via the process in the step S23). More specifically, an average period of evaluation values of individual filtering systems 3 is computed per category via the process executed in the course of step S38, and then, such a filtering system 3 rated to be of the highest value (i.e., the one which executed the most appropriate filtering process in average) is stored in the storage unit 68 as the preferential filtering system 3.

FIG. 10 designates a typical example of the preferential filtering system 3 per category. In this example, in terms of such a filtering category specifying computer-related data, value of average period of evaluation values of the filtering system 3-1 is rated to be 1.3, whereas value of average period of evaluation values of another filtering system 3-2 is rated to be 1.1. Because of this, the former filtering system 3-1 compatible with a greater value is registered as the preferential filtering system 3. In the same way, in terms of such a filtering category specifying technical data, the filtering system 3-2 is registered as the preferential filtering system 3. Likewise, in terms of such a filtering category specifying business information, the filtering system 3-1 is registered as the preferential filtering system 3. Likewise, in terms of such a filtering category specifying music contents, the filtering system 3-2 is registered as the preferential filtering system 3.

In process of step S28, when the objective category specifies the computer-related data, the filtering system 3-1 is selected as the preset preferential filtering system 3.

When step S29 is entered, among those filtering results received in the course of executing step S27, the CPU 61 of the filtering evaluation system 5 causes display format of the result of a filtering process executed by the preferential filtering system selected via the preceding step S28 to be converted into such a display format compatible with the user terminal 1. When the next step S30 is entered, the CPU 61 provides the user terminal 1 via transmission with the filtering result generated by the preferential filtering system 3 having own display format converted in the preceding step S29.

Taking FIG. 10 for example, when the objective category specifies either computer-related data or business information, and yet, in the case in which the result of the filtering process executed by the filtering system 3-1 belongs to such a filtering category specifying technical data or music contents for example, the result of the filtering process executed by the filtering system 3-2 is converted into the display format of the user terminal 1 before being transmitted thereto.

While step S4 is underway, the CPU 21 on the part of the user terminal 1 receives the filtering result including a list of items transferred from the filtering evaluation system 5, and then outputs the result to the output unit 27 for displaying it. Inasmuch as the display format has already been converted by the filtering evaluation system 5 into the display format compatible with the user terminal 1, even when the user terminal 1 consists of a personal computer, or a portable telephone set, or a personal digital assistant, for example, it is possible to display the result of the above filtering process.

The filtering result generated via the above processes has been acquired via such a preferential filtering system 3 which executed the most appropriate filtering process in relation to specific items among a variety of the filtering results generated via a plurality of filtering systems 3 under instruction of the filtering evaluation system 5. As a result, it is possible for every user to readily and efficiently acquire more appropriate result of the filtering process without necessarily generating any instruction in particular.

When step S5 is entered, availing of the list of items included in the filtering result, user of the user terminal 1 properly selects a desired item for practical use. The process to enable the user to properly utilize the selected item includes a step of accessing a linked destination designating detailed data of selected items and another step of downloading the detailed data of the selected items.

When the next step S6 is entered, the CPU 21 of the user terminal 1 acquires compatibility of the item input by the user himself.

Figure 11:
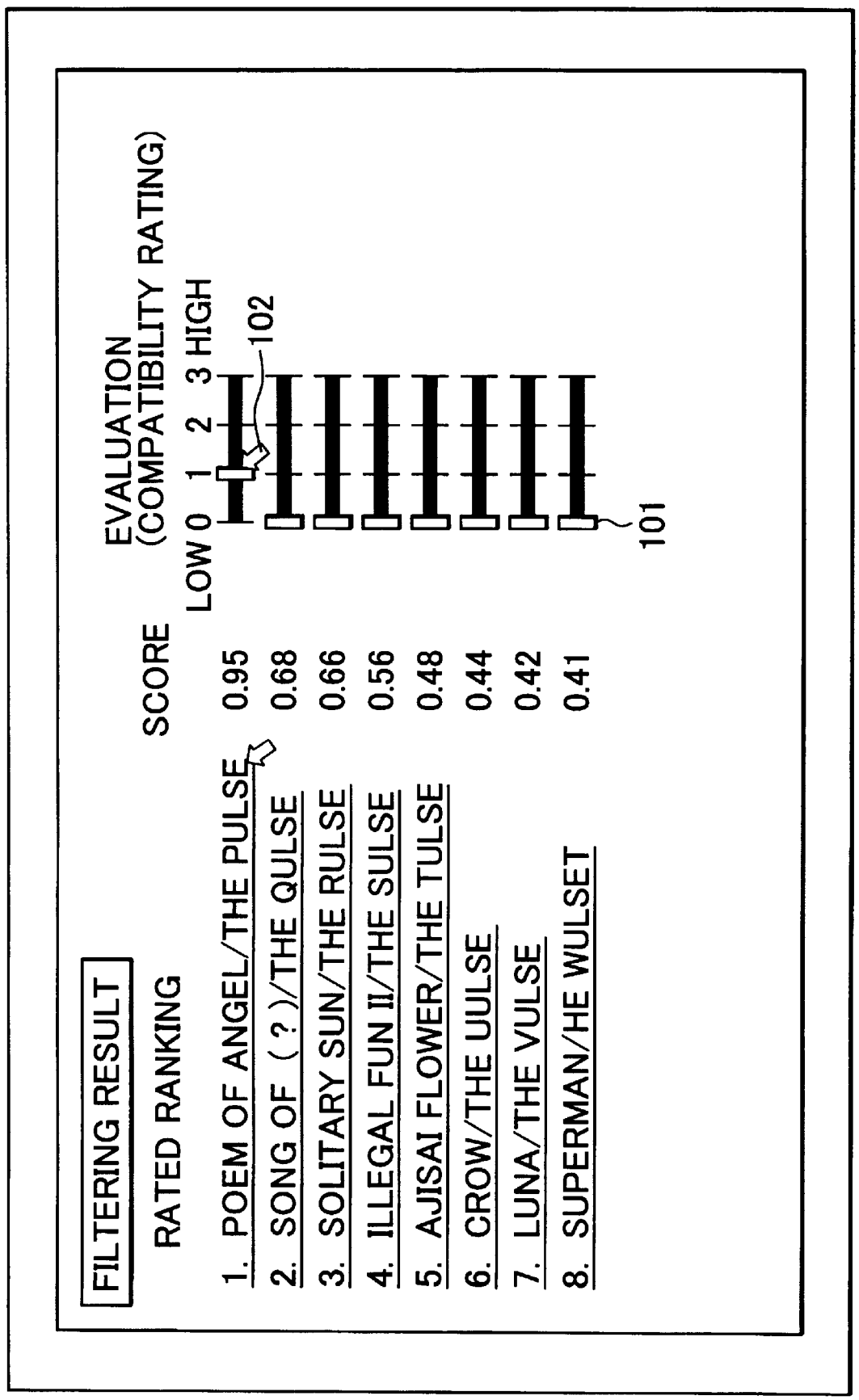
FIG. 11 presents an example of GUI (Graphic User Interface) for inputting compatibility according to a preferred embodiment of the present invention.

FIG. 11 designates an example of the graphical user interface (GUI) when an individual user inputs rating of compatibility based on the filtering result shown on the display unit of the output unit 27. In this example, as the filtering result generated by the preferential filtering system 3, titles of music tunes and name of performers are individually displayed in order of higher score in conjunction with the corresponding scores. Further, a plurality of buttons 101 for the input of the compatibility rating and a mouse cursor 102 are disposed to the right of individual score displays in order to shift the buttons 101. By way of operating the mouse cursor 102 functioning as an input means to cause the buttons 101 to be shifted to any position among ratings of compatibility designated by four grades comprising 0, 1, 2, and 3, user sets the compatibility ratings to the filtering result of a corresponding ranking. If the filtering result matches the desired one, the user sets the highest value "3" as the compatibility rating. On the other hand, if the filtering result is farthest from the desired one, the user sets the lowest value "0" as the compatibility rating.

In the example shown in FIG. 11, rating "1" of compatibility is set for a music tune rated as the uppermost in the filtering result.

Figure 12:
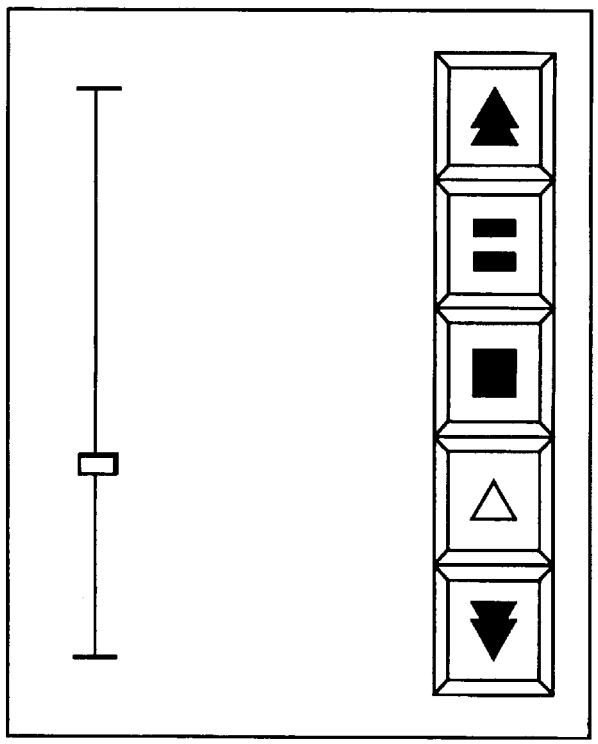
FIG. 12 presents an example of GUI for inputting compatibility, according to a preferred embodiment of the present invention.

FIG. 12 illustrates another example of the graphical user interface (GUI) used for setting compatibility rating. In this example, when a music tune comprising filtered contents is reproduced by a user, compatibility rating is set in correspondence with accumulated rounds of reproduction. In the example illustrated in FIG. 12, button 111 designates the accumulated rounds of reproduction. When the round of reproduction is 0, compatibility rating is set to 0. When the round of reproduction is up to 10, compatibility rating is set to 1. When the round of reproduction is up to 20, compatibility rating is set to 2. In the same way, when the round of reproduction exceeds 30, compatibility rating is set to 3.

Compatibility rating can be set by enabling an individual user to manually operate a cursor 102 based on the display of the accumulated rounds of reproduction automatically computed by the CPU 21. It is also possible to cause the CPU 21 to automatically set compatibility rating based on the round of reproduction.

When automatically setting compatibility rating related to a specific item via operation of the CPU 21, it is also possible to set compatibility rating to be 0 when a user does not utilize the corresponding item and also set the compatibility rating to be 2 when the user utilizes this item.

When an objective item comprises a music tune for example, by way of automatically accumulating the reproduction rounds via the CPU 21, it is possible to determine compatibility rating by applying the reproduction rounds within a predetermined period of time. For example, it is possible to compute compatibility rating $A_{ni}$ by applying an equation shown below.

$$A_{ni} = \text{reproduction rounds} \times 3/30$$

The above-cited coefficient $3/30$ is a predetermined value. When applying the above equation, assuming that compatibility rating is computed based on the reproduction rounds per month for example, compatibility rating is computed to be 1.5 when reproduction is executed by 15 rounds per month.

When the next step S7 is entered, the CPU 21 of the user terminal 1 transmits the antecedents related to utilization of items including the compatibility rating $A_{ni}$ to the filtering evaluation system 5.

While step S31 is underway, the CPU 61 of the filtering evaluation system 5 receives the antecedents related to utilization of items transmitted from the user terminal 1. In this case, those antecedents related to utilization of all items acquired by the user via the past filtering processes are transmitted from the user terminal 1.

When step S32 is entered, the CPU 61 of the filtering evaluation system 5 computes an evaluation value $V_n$ of the filtering system n in accordance with an equation shown below based on the compatibility rating $A_{ni}$ of a designated item contained in the antecedents related to utilization of this item received via the preceding step S31 and also based on the ranking order $X_{ni}$ of this item contained in the filtering result.

Equation 1:

$$Vn = \sum_{i=1}^{m} \frac{Ani}{Xni}$$

A table shown in FIG. 13 exemplifies evaluation values $V_n$ which have been computed via the above equation 1. In FIG. 13, value of the compatibility rating $A_{n1}$ of the item 1 is determined to be 3, value of the compatibility rating $A_{n2}$ of the item 2 is determined to be 2, value of the compatibility rating $A_{n3}$ of the item 3 is determined to be 1, and value of the compatibility rating $A_{n4}$ of the item 4 is determined to be 0, respectively.

According to the filtering result via the filtering system 3-1, value of listing order $X_{11}$ of the item 1 is rated to be 4, value of listing order $X_{12}$ of the item 12 is rated to be 7, value of listing order $X_{13}$ of the item 3 is rated to be 8, and value of listing order $X_{14}$ of the item 4 is rated to be 19, respectively.

Accordingly, based on the following equation, the evaluation value $V_n$ in the above case is determined to be 1.160714:

$$V_n = 3/4 + 2/7 + 1/8 = 1.160714$$

According to the filtering result via the filtering system 3-2, value of listing order $X_{21}$ of the item 1 is rated to be 6, value of listing order $X_{22}$ of the item 2 is rated to be 8, value of listing order $X_{23}$ of the item 3 is rated to be 40, and value of listing order $X_{24}$ of the item 4 is rated to be 51, respectively. Accordingly, as shown in the following equation, evaluation value $V_n$ in this case is determined to be 0.75:

$$V_n = 3/6 + 2/8 + 1/40 = 0.75$$

When step S33 is entered, the CPU61 of the filtering evaluation system 5 sorts out the filtering system 3 in order of higher evaluation value $V_n$ of a filtering system n.

After executing a single round of filtering process, the CPU 61 of the filtering evaluation system 5 acquires antecedents related to utilization of items by a corresponding user up to a moment at which the user closes the page designating the filtering result, and then computes evaluation values corresponding to individual filtering systems 3.

Alternatively, after executing a single round of filtering process, the CPU 61 of the filtering evaluation system 5 acquires antecedents related to utilization of items by a corresponding user up to a period at which a predetermined time (one month for example) is past. In this case, it is possible to execute weighting in order that the longer the time past from the filtering process in the course of utilizing an item, the lower the compatibility rating.

When step S8 is entered, in response to user's request for displaying sorted average evaluation values during a specific period per filtering system 3, the CPU 21 of the user terminal 1 requests the filtering evaluation system 5 to display sorted average evaluation values $V_{nav}$ during the corresponding period of time.

On receipt of the request from the user terminal 1 for displaying sorted average evaluation values during a specific period per filtering system 3, step S34 is entered, in which the CPU 61 of the filtering evaluation system 5 computes average evaluation value Vnav within a predetermined period of time per filtering system n in accordance with an equation shown below.

Equation 2:

$$Vnav = \frac{\sum_{i=1}^{M} Vni}{M}$$

Value of denominator M shown in the above equation designates the number of evaluation values $V_n$ generated during an averaged period of time.

When step S35 is entered, the CPU 61 of the filtering evaluation system 5 sorts out a average evaluation value $V_{nav}$ during a corresponding period per filtering system 3 computed via step S34, and then transmits the sorted average evaluation value $V_{nav}$ to the user terminal 1.

When step S9 is entered, the CPU 21 of the user terminal 1 receives the average evaluation value $V_{nav}$ during the corresponding period per filtering system 3 delivered from the filtering evaluation system 5, and then outputs the received average evaluation value Vnav to the output unit 27 for display thereon.

Next, step S10 is entered, in which the CPU 21 of the user terminal 1 requests the filtering evaluation system 5 to display sorted average evaluation value $V_{nav}$ during a corresponding period per category.

When step S36 is entered, on receipt of a request from the user terminal 1, the CPU 61 of the filtering evaluation system 5 computes average evaluation value $V_{nav}$ during a corresponding period per category per filtering system n in relation to the requesting user. Next, step S37 is entered, in which the CPU 61 sorts out the computed average evaluation values $V_{nav}$ for the corresponding period per category, and then transmits the sorted average evaluation values $V_{nav}$ to the user terminal 1.

When step S11 is entered, the CPU 21 of the user terminal 1 receives the average evaluation value $V_{nav}$ for the corresponding period per category from the filtering evaluation system 5, and then outputs the received average evaluation value $V_{nav}$ to the output unit 27 for display thereon.

After executing the above serial processes, as shown in FIG. 10, it has become possible to display the average evaluation values for the corresponding period per category in the sorted condition.

When step S38 is entered, based on the result of computation via step S36, the CPU 61 of the filtering evaluation system 5 sets a specific filtering system exhibiting the highest average evaluation value $V_{nav}$ for the corresponding period per category as the sole preferential filtering system per category and then stores this effect in the storage unit 38. In this way, it is possible to register such a preferential filtering system shown in FIG. 10 per category. The preferential filtering system represents the one that has executed such a filtering process most compatible with user's request in regard to the corresponding item. By way of selecting the result of filtering process executed by the preferential filtering system via step S28, it is possible to effectively provide an individual user with an optimal filtering result.

Next, step S39 is entered, in which the CPU 61 of the filtering evaluation system 5 notifies a business operator running the filtering system 3 of the evaluation value $V_n$ computed via step S32 and the average evaluation value $V_{nav}$ for the corresponding period computed via step S36 via the Internet service line 2. As a result, it is possible for the business operator to construct such a more effective filtering system 3 based on the delivered evaluation value $V_n$ and average evaluation value $V_{nav}$ for the corresponding period.

When selecting some of filtering systems 3 for instructing execution of a filtering process in the step S26, it is also possible to serially select a predetermined number of filtering systems 3 from those which exhibit high evaluation values in average for a specific period against an individual user described earlier in reference to FIG. 10. When introducing this method, it is possible to decrease amount of the filtering process to be executed, and yet, it is also possible to prevent the filtering process from being delayed.

Alternatively, it is also possible to select a predetermined number of filtering systems 3 in order of higher evaluation values against user and also in order of higher evaluation values in average in the case of filtering specific items requested by a plurality of users as well.

Further, in the case in which new filtering systems have been registered, it is also possible to properly select those which exhibit high evaluation values against users and the one newly registered. It is also possible to select those filtering systems exhibiting high evaluation values in average when filtering specific items requested by a plurality of users and also select the one newly registered by way of adequately mixing them with each other. By way of introducing this method, even when new filtering systems have been registered, it is possible for individual users to automatically start up evaluation and constantly utilize the updated and optimal filtering systems without necessarily executing any particular process.

In the previous step S24, the filtering evaluation system 5 transmits filtering additional data to designated filtering systems 3. However, in the case in which the user data base 91 is independently disposed, it is also possible to enable the filtering systems 3 to directly access the user data base 91.

In the above processes, the evaluation value $V_n$ is computed based on the compatibility rating An and the ranking order $X_i$ of individual items. Alternatively, it is also possible to compute the evaluation value $V_n$ based on scores $Y_i$ and compatibility ratings An corresponding to individual items given in the individual filtering systems 3 in accordance with an equation shown below.

Equation 3:

$$Vn = \sum_{i=1}^{m} Ani \times Yni$$

A table shown in FIG. 14 exemplifies evaluation values $V_n$ which are respectively computed via the above processes. In the exemplified filtering system 3-1, score $Y_{11}$ of the item 1 is rated to be 0.8, score $Y_{12}$ of the item 2 is rated to be 0.6, and score $Y_{13}$ of the item 3 is rated to be 0.4. Accordingly, the evaluation value $V_n$ is rated to be 4.0 as shown in the following equation.

$$V_n 3 \times 0.8 + 2 \times 0.6 + 1 \times 0.4 = 4.0$$

Likewise, in the exemplified filtering system 3-2, score $Y_{21}$ of the item 1 is rated to be 0.6, score $Y_{22}$ of the item 2 is rated to be 0.5, and score $Y_{23}$ of the item 3 is rated to be 0.2. Accordingly, the above evaluation value $V_n$ is rated top be 3.0 as shown in the following equation.

$$V_n = 3 \times 0.6 + 2 \times 0.5 + 1 \times 0.2 = 3.0$$

The above description has solely referred to the filtering system 3 comprising a plurality of individual filtering systems. However, in such a case in which a plurality of mutually different filtering modes are present in a single filtering system, for example, comprising such a mode which filters a synonym and such a mode which does not filter a synonym, it is also possible to apply the present invention by way of utilizing a plurality of modes as the above-referred filtering systems.

When executing transmission of evaluation values, the above systems individually apply the Internet service line 2. However, it is also possible to apply LAN and other network service lines as well.

It is possible to directly connect the filtering evaluation system 5 to the user terminal 1 or integrate them together. In the same way, it is also possible to directly connect the filtering evaluation system to the filtering systems 3 or integrate them together.

Those serial processes described above can be executed by applying a hardware means. Further, those serial processes can also be executed via software means. In the case of executing those serial processes via software means, those programs for constituting practical software means are installed into such a computer which is incorporated in an exclusive-use hardware system or such a general purpose personal computer capable of executing a variety of functions by way of installing a variety of programs therein via a specific network service line or a specific recording medium.

As shown in FIG. 2 and FIG. 3, independent of the processing facilities themselves, the above-cited recording medium typically includes the following package media: magnetic discs 41 and 81 (including floppy discs) which are recorded with such a program to be distributed for delivery of programs to users; optical discs 42 and 82 including so-called compact-disc read-only-memory (CD ROM) and digital versatile disc (DVD); opto-magnetic discs 43 and 83 including mini discs (MD), or semiconductor memories 44 and 84. In addition, the recording medium further comprises ROMs 22 and 68 recorded with a variety of programs provided for users in the state previously installed in the processing facilities, and such a hard disc included in the storage units 28 and 68, for example.

In the above description, those processing steps describing such programs recorded in recording media include those processing steps executed in order of description via time passage, and yet, also include such processes to be executed in parallel or on the individual basis without necessarily being processed via time passage.

Further, in the above description, the term "system" refers to the whole processing facilities consisting of a plurality of processing apparatuses.

As described above, inasmuch as evaluation values of the filtering systems are computed based on the antecedents related to utilization of items on the part of individual users and also based on the result of the filtering of objective items, it is possible for the data processing apparatuses, data processing methods, and programs of recording media, to enable the filtering systems to effectively evaluate the result of the filtering process as desired by users, whereby enabling users to acquire the filtering results as required.

Finally, the configurations and structures of respective units and portions described specifically with respect to the preferred embodiment of the present invention are only examples of realization of the present invention, so the embodiments thereof should not be construed as to limiting the technical scope of the present invention.

What is claimed is:

1. A data processing apparatus which enables a plurality of filtering systems to execute a process for filtering an item, said data processing apparatus comprising:

a first acquiring means for acquiring a request for executing a process for filtering said item;

an instructing means for instructing said plurality of filtering systems to execute said filtering process against said item based on said request acquired via said first acquiring means;

a second acquiring means for acquiring results of said filtering process for said item from said plural filtering systems;

a third acquiring means for acquiring antecedents related to utilization of said item on the part of an individual user; and an evaluation value computing means for computing an evaluation value related to said process for filtering said item executed by said plural filtering systems based on antecedents of utilization of said item acquired via said third acquiring means and also based on the result of said process for filtering said item acquired via said second acquiring means.

2. The data processing apparatus according to claim 1, wherein said antecedents related to utilization of said item includes a compatibility rating set by said user.

3. The data processing apparatus according to claim 1, further comprising a fourth acquiring means for acquiring an additional filtering data related to at least to one element from the group consisting of said filtering antecedents, taste data, or attribute data respectively related to said user; wherein said instructing means instructs said plural filtering systems to execute a filtering process by way of adding said additional filtering data acquired via said fourth acquiring means to said item.

4. The data processing apparatus according to claim 1, wherein said evaluation value computing means computes said evaluation value by way of executing a weighting process based on date and time of utilization of said item.

5. The data processing apparatus according to claim 1, further comprising a setting means for setting a preferential filtering system based on said evaluation value.

6. The data processing apparatus according to claim 5, wherein said setting means sets said preferential filtering system based on an average value of said evaluation value during a predetermined period of time.

7. The data processing apparatus according to claim 5, further comprising an output means for outputting result of a filtering process executed by said preferential filtering system to terminal equipment.

8. The data processing apparatus according to claim 1, further comprising an average value computing means for computing an average value of said evaluation value during a predetermined period of time per filtering system described above.

9. The data processing apparatus according to claim 8, further comprising a sorting means for sorting said filtering systems based on an average value of said evaluation value.

10. The data processing apparatus according to claim 8, wherein said average value computing means computes an average values of said evaluation value per category of said item.

11. The data processing apparatus according to claim 8, further comprising a notifying means for notifying said filtering systems of said evaluation values and an average value thereof.

12. The data processing apparatus according to claim 1, further comprising:

a transmitting means for transmitting a user interface required for inputting a filtering condition based on said item; and a converting means for causing said filtering condition input based on said user interface transmitted via said transmitting means to be converted into a condition compatible with said filtering systems; wherein said instructing means instructs said filtering systems to execute a filtering process based on a condition compatible with said filtering systems converted by said converting means.

13. A data processing method enabling a plurality of filtering systems to execute a process for filtering an item based on a request from an individual user, said data processing method comprising:

a first acquiring step of acquiring a request for executing a process for filtering said item;

an instructing step of instructing said plural filtering systems to execute a process for filtering said item based on said request acquired via said first acquiring step;

a second acquiring step of acquiring result of a process for filtering said item from said plural filtering systems;

a third acquiring step of acquiring antecedents related to utilization of said item on the part of an individual user; and an evaluation value computing step of computing evaluation values related to said process for filtering said item executed by said plural filtering systems based on antecedents related to utilization of said item by said user and also based on the result of said process for filtering said item acquired via said second acquiring step.

14. A recording medium recorded with a software program readable by a computer, said program in a data processing apparatus enables a plurality of filtering systems to execute a process for filtering an item based on a request from an individual user, wherein said software program comprises:

a first acquiring step of acquiring a request for executing a process for filtering said item;

an instructing step of instructing said plural filtering systems to execute a process for filtering said item based on said request acquired via said first acquiring step;

a second acquiring step of acquiring result of said process for filtering said item from said plural filtering systems;

a third acquiring step of acquiring antecedents related to utilization of said item on the part of said user; and an evaluation value computing step of computing evaluation values related to said process for filtering said item executed by said plural filtering systems based on said antecedents related to utilization of said item by said user acquired via said third acquiring step and also based on the result of said process for filtering said item acquired via said second acquiring step.

15. A data processing system comprising a user terminal operated by an individual user, a plurality of filtering systems for executing a process for filtering an objective item, and a data processing apparatus which requests said plural filtering systems to execute a process for filtering said item based on said request from said user, said user terminal comprising:

a transmitting means for transmitting a request to said data processing apparatus to execute a process for filtering said item; and a receiving means for receiving the result of said process for filtering said item from said data processing apparatus; wherein said data processing apparatus comprises:

a first acquiring means for acquiring a request for executing a process for filtering said item;

an instructing means for instructing said plural filtering system to execute a process for filtering said item based on said request acquired via said first acquiring means;

a second acquiring means for acquiring result of said process for filtering said item from said plural filtering systems;

a third acquiring means for acquiring antecedents related to utilization of said item on the part of said user; and an evaluation value computing means for computing evaluation values related to the process for filtering said item executed by said plural filtering systems based on antecedents related to utilization of said item acquired via said third acquiring means and also based on the result of said process for filtering said item acquired via said second acquiring means;

wherein each of said filtering system comprises:

an executing means for executing a process for filtering said item based on a request from said data processing apparatus; and a transferring means for enabling the result of said process for filtering said item acquired via execution performed by said executing means to be transferred to said data processing apparatus.

* * * * *